(No Model.)  
2 Sheets—Sheet 2.
H. BESSON & E. N. KENT.
MACHINERY FOR GRINDING, SHAPING, AND POLISHING GLASS.
No. 393,811.  
Patented Dec. 4, 1888.
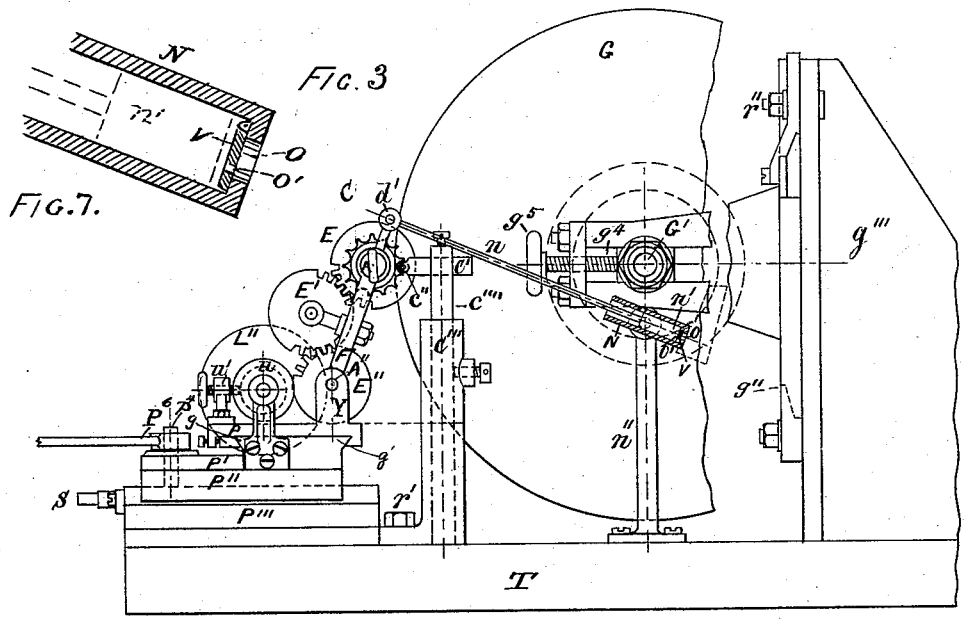
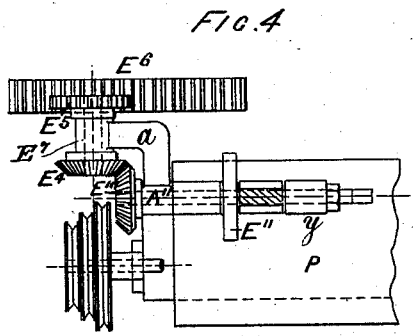
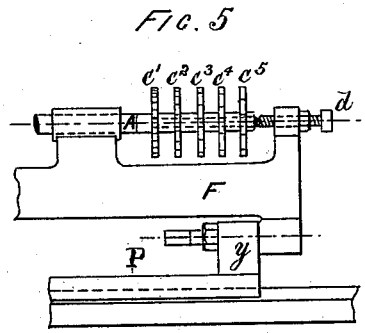
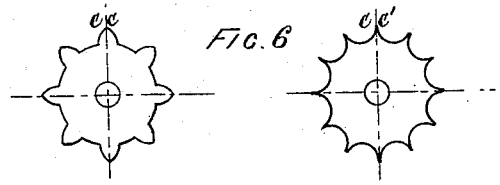
Witnesses:  
W. R. Haight.  
J. T. Reynolds.
Inventors:  
Hyppolite Besson,  
and Ernest Neil Kent.  
by Wm. H. Babcock,  
Atty.

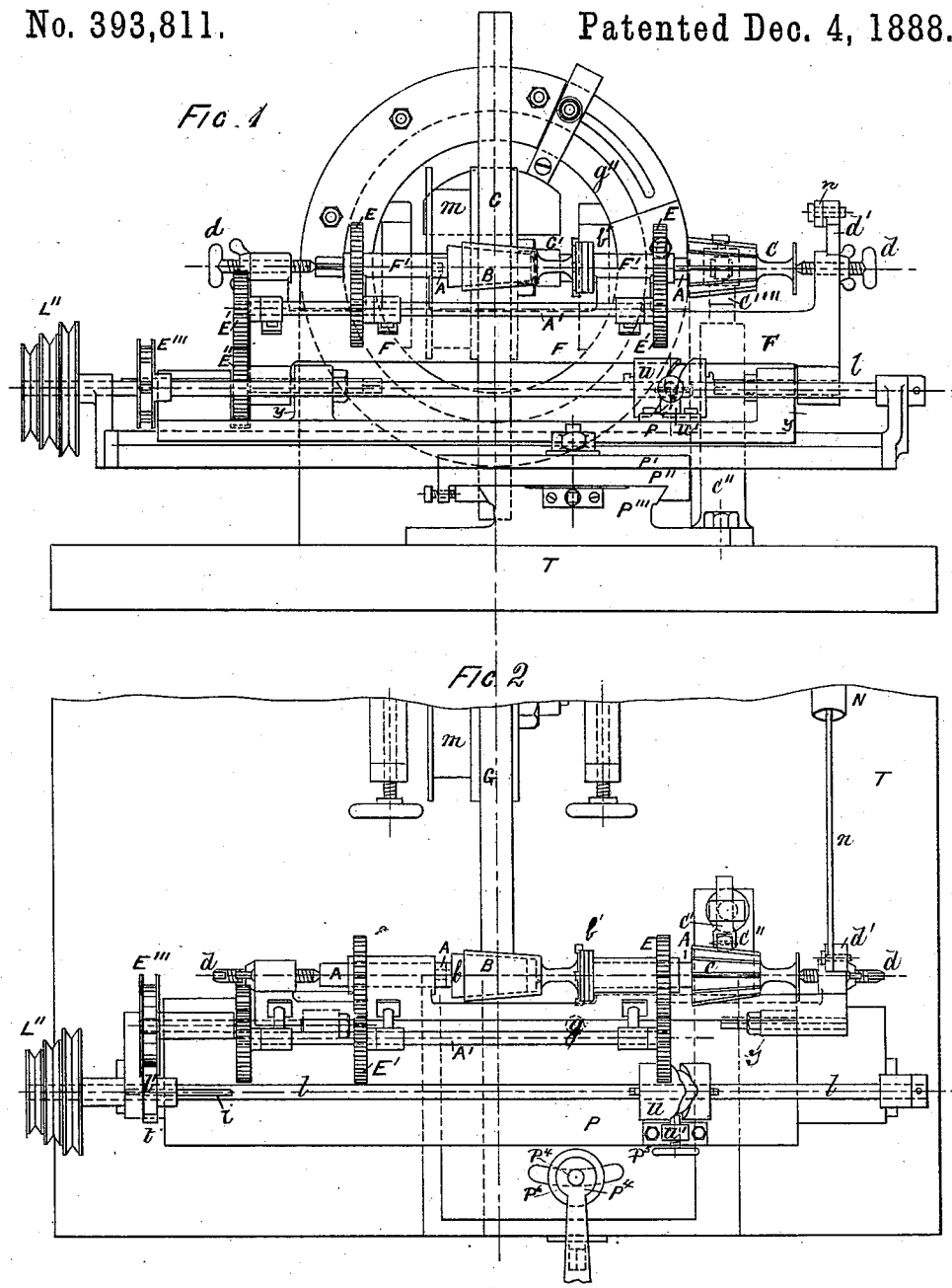

UNITED STATES PATENT OFFICE.

HYPPOLITE BESSON AND ERNEST NEILD KENT, OF LONDON, COUNTY OF MIDDLESEX, ENGLAND.

MACHINERY FOR GRINDING, SHAPING, AND POLISHING GLASS.

SPECIFICATION forming part of Letters Patent No. 393,811, dated December 4, 1888.

Application filed May 10, 1886. Serial No. 201,703. (No model.) Patented in England May 9, 1884, No. 7,461.

*To all whom it may concern:*

Be it known that we, HYPPOLITE BESSON, mechanical engineer, and ERNEST NEILD KENT, brush-maker, subjects of the Queen of Great Britain, residing at London, in the county of Middlesex, England, have invented new and useful Improvements in Machinery for Grinding, Shaping, and Polishing Glass, (for which we have obtained Letters Patent in Great Britain, No. 7,461, dated May 9, 1884;) and we do hereby declare the following to be a full, clear, and exact description of the invention, reference being had to the drawings accompanying the same.

Our invention relates to improved machinery for grinding or cutting facets and waved or curved lines or flutes round hollow glass articles, such as tumblers, drinking glasses, decanters, and such like forms of glass.

In the accompanying drawings, Figure 1 is a front view of a machine arranged to grind straight facets, grooves, or flutes on hollow glasses, such as tumblers and the like. Fig. 2 is a plan and Fig. 3 an end view of the same machine; and Figs. 4, 5, and 6 are detailed views of modifications. Fig. 7 is a detail view, enlarged, of the valve-plunger and cylinder hereinafter described.

F designates a rocking frame pivoted at its lower end on a shaft, A″, passing through bearings Y, raised on a slide, P, which has lateral motion. This slide fits a guideway, $g'$, (see Fig. 3,) raised on a plate, P′, the latter being mounted on a second slide, P″, which has motion transversely to that of slide P. The plate P′ is connected to slide P″ by a central pivot, $g$, and by an adjusting-screw, $P^4$, which passes up from said slide P″ through a curved slot, $P^5$, made in plate P′. A nut, $P^6$, fitting on said screw above said plate, serves to lock in any position of adjustment on pivot $g$ the plate P′ and the upper slide, P, carried thereby. In this way the position of the latter is regulated. When we grind lateral facets or hollow glass, we make this slide P receive a to-and-fro motion. This is effected by means of a grooved cam, $u$, rotating on spindle $l$ and engaging a pin, $u'$, on carriage P. The spindle $l$ is provided with a belt-pulley, L″, from which it receives rotation, and also with a small toothed wheel, $l'$, splined on said shaft. The wheel $l'$ has one or more teeth, $t$, formed round its periphery, which at each revolution will rotate the wheel E‴ to a distance equal to the number of teeth formed on it, and through intermediate gear the axis or two spindles, A A, receive the partial rotation each time the tooth $t$ or teeth of wheel $l'$ meet with wheel E‴. This step-by-step motion can be varied by increasing or diminishing the number of teeth round the wheel $l'$ and E‴ by change of wheel. Thus it is evident, if a glass, B, is fixed between these spindles A A on the same axis as a pattern, C, and both receiving the same step-by-step motion, that the time taken between one step and another will be the time taken by the grinder to cut a facet or any similar design on the glass.

The glass B is fixed between the two spindles A A by means of a concentric chuck, $b'$, to hold the foot of it and suitable core, $b$, which is inserted in the hollow of the glass. The two spindles, with the glass B and pattern C, are finally secured by the screws $d$ $d$.

The rocking frame F vibrates to and from the grinding-wheel G, and is controlled by the pattern C, which turns against a guide-roller, C″. By screwing the slide P″ either to or from the grinder the frame F F is made to press more or less heavily on the grinder.

When the glass B is turning by the motion imparted by wheel $l'$, we make the glass rise from the grinder and return to it by the following device: We provide on the surface of the pattern C, Fig. 3, or on the outline of a former or formers, $c\ c\ c\ c'$ or $c'\ c^2\ c^3$, Figs. 5 and 6, deep depressions and projections, which, as soon as the pattern receives its next impulse, will rotate to its next depression, meet the fixed guide or roller C″, and raise the glass from the grinder to a distance equal to that between the depression and projection made on the pattern, and while the wheel $l'$ is not engaged with the wheel E‴ the roller or guide C″ will rest in the depression and the grinder will be cutting the facet.

To return the glass gently against the grinder, we use the following arrangement, (shown in Fig. 3:) A bracket, $d'$, fixed on the end of the axis or the head-stock of screw $d$, carries a small bar, $n$, connected to a plunger, $n'$, of the cylinder N, which is mounted on a bracket, n'', attached to the table T. In the interior of the cylinder a valve, V, is fitted to a port, O, and has a small aperture, O', which may be made adjustable. The action of this device is as follows: As soon as the projection on the pattern raises the glass from the grinder the bar n is drawn with the plunger n' by the same motion away from the valve V. Then the valve V opens and allows air to fill the space made by the withdrawal of the plunger. When the rocking frame brings the glass back to the grinder as the depression on the other side of said projection is presented to said pattern, the plunger n', being connected by bar n to said frame, receives the same movement. The said plunger in said movement passes back in said cylinder and causes the valve V to close. The air imprisoned in the space between the plunger and valve can escape only by the small aperture O'. This escape being gradual and slow, the resistance of said air necessarily prevents the frame from falling suddenly and makes impact of the glass on the grinder very easy and gentle. At each rise and descent of the glass the action above described is repeated.

In grinding long facets, flutes, or such like designs on glass the guide or roller C'' is placed stationary on the table T, and the alternate rectilinear movement of the carriage P makes the pattern C slide laterally against it; but when we cut small circular facets or any such designs we fix the guide or roller C'' on the carriage P, so that both receive the same movement. The guide or roller C'' is also fixed on the carriage P when we use a former or templet, $c\ c\ c\ c'$, Fig. 6, or a series of them, $c'\ c^2\ c^3$, Fig. 5, mounted on the axis A, taking the place of pattern C. In this case we use a small roller; but when the projections and depressions made on the outline of the pattern are too small we use a blank point or tracer. In order to cut spiral flutes or any similar designs in round hollow glass, we attach a loose arm, $a$, on the same axis, A''. This arm is bent at right angles, and its outer end affords a bearing for a short shaft, $E^5$, which is at right angles to shaft or axis A''. The inner end of this short shaft has mounted on it a bevel-wheel, $E^4$, which meshes with a similar wheel, $E'''$, on the proximate end of shaft or axis A''. The other end of shaft $E^5$ has mounted on it a gear-wheel, $E^5$, which engages a fixed rack, $E^6$. By having arm $a$ fitted loosely on axis A'' it is allowed a certain range of rocking, whereby we are enabled to vary the size of wheel $E'''$, so as to change the pitch of the spiral to be ground on the glass. While the plate P moves in its alternate rectilinear movement the wheel $E^5$ is carried by the said movement and rolls to and fro on the rack $E^6$, transmitting a rotary to-and-fro motion to its bevel-wheels $E^4\ E'''$ and to the axis or spindles A A, carrying the glass and the pattern. This combined movement with the grinder will produce a spiral line, flute, groove, or such like design until the guide C'' touches the pattern C, or the depression made in it. Then the grinder G will cease to cut, and the glass has to be lifted and turned to the next spiral line, groove, flute, or such like design. The mechanism, with the glass, is lifted from the grinder either by hand or by projections. The glass is turned to its next spiral by lifting the arm $a$ and turning the wheel $E^5$.

Now, having described the application of our invention for grinding, shaping, and polishing glass of different form and size and the manner of performing the same, it is evident that various modifications of the grinder, with the rotary axis or axes carrying the glass and the pattern, can be made, according to the shape and the size of the glass to be ground, without departing from the object of this invention; and we would have it understood that we claim—

1. In a machine for grinding, shaping, and polishing glass, the combination, with the grinder G, of the rocking frame F, the carriage or lateral slide P, adjustable round the center $g$ and made to receive a to-and-fro motion by the pin $u'$ and grooved cam $u$, the spindles A A, the former or pattern C, guide or roller C'', toothed wheel $l'$, and toothed gear E E' E'' E''', substantially as set forth.

2. The cylinder N, provided with port O, in combination with the valve V, provided with aperture O' and hinged on the inside of said cylinder to cover said port, the plunger n', working in said cylinder, the guide or roller C'', the pattern C, the spindles A A, which hold the glass to be operated on, the rocking frame F, on which said spindles are mounted, and the grinding-wheel G, which operates on the glass, substantially as set forth.

In testimony whereof we have signed our names to this specification in the presence of two subscribing witnesses.

HYPPOLITE BESSON.
ERNEST NEILD KENT.

Witnesses:
ARTHUR E. EDWARDS,
E. SCRIVEN.